United States Patent [19]
Fadoul

[11] Patent Number: 5,881,632
[45] Date of Patent: Mar. 16, 1999

[54] AUTOMATIC COOKING APPARATUS

[76] Inventor: Fadoul George Fadoul, 458 D. Hamilton St., Somerset, N.J. 08873

[21] Appl. No.: 921,907

[22] Filed: Sep. 2, 1997

[51] Int. Cl.[6] .............................. A47J 27/00; A47J 37/00; A47J 37/06; A47J 43/04
[52] U.S. Cl. ................................ 99/326; 99/331; 99/352; 99/355; 99/357; 99/407; 222/501; 364/400
[58] Field of Search ...................... 99/325–328, 331–335, 99/348, 352–355, 357, 403–407, 468, 485; 219/621, 663, 652, 492, 494, 497; 221/289, 290, 293; 222/501; 364/400, 477–479, 557; 414/225, 758, 901, 764; 426/523, 510, 511, 231

[56] References Cited

U.S. PATENT DOCUMENTS

| | | | |
|---|---|---|---|
| 4,649,810 | 3/1987 | Wong . | |
| 4,742,455 | 5/1988 | Schreyer | 364/400 |
| 4,872,112 | 10/1989 | Hungerford | 364/400 |
| 4,942,807 | 7/1990 | Wong | 414/758 |
| 4,993,593 | 2/1991 | Fabiano et al. | 219/442 X |
| 5,031,518 | 7/1991 | Bordes | 99/348 X |
| 5,050,490 | 9/1991 | Yahav et al. | 99/348 X |
| 5,172,328 | 12/1992 | Cahlander et al. . | |
| 5,357,426 | 10/1994 | Morita et al. . | |
| 5,363,746 | 11/1994 | Gordon . | |
| 5,365,835 | 11/1994 | Naramura | 99/325 X |
| 5,386,762 | 2/1995 | Gokey . | |
| 5,412,171 | 5/1995 | Yahav et al. . | |
| 5,522,309 | 6/1996 | Mizobuchi et al. | 99/334 |
| 5,555,793 | 9/1996 | Tocchet et al. | 99/326 |
| 5,619,906 | 4/1997 | Ishida | 99/325 X |
| 5,724,886 | 3/1998 | Ewald et al. | 99/468 X |
| 5,778,767 | 7/1998 | Rudesill | 99/407 X |
| 5,791,234 | 8/1998 | Newton et al. | 99/326 |

FOREIGN PATENT DOCUMENTS 9510969  4/1995  WIPO .

*Primary Examiner*—Timothy F. Simone
*Attorney, Agent, or Firm*—Jeffrey I. Kaplan; Kaplan & Gilman, LLP

[57] ABSTRACT

A computerized cooker is described which sequentially enters numerous food items into various cooking pots and introduces liquid ingredients as well. Food is cooked in accordance with a specified computer program.

7 Claims, 8 Drawing Sheets

AUTOMATIC COOKING APPARATUS

TECHNICAL FIELD

This invention relates to computerized cooking, and more specifically, to an improved method and apparatus for the automatic cooking of meals, preferably at home.

BACKGROUND OF THE INVENTION

Automatic cooking apparatus typically comprise a microprocessor controlled series of food storage compartments and a cooking vessel. Typically, a plurality of ingredient storage store various different ingredients, and a computer program is used to specify schedules for dispensing the ingredients from the storage compartments into a cooking vessel.

U.S. Pat. No. 4,649,810 to Wong shows one such apparatus. The Wong arrangement includes a carousal of ingredient storage vessels which rotates and dispenses ingredients into a pot which may then be heated. Additionally, Wong provides apparatus for stirring the ingredients as they cook.

An additional prior art patent describing computerized cooking is U.S. Pat. No. 5,386,762 issued to Gokey. In the Gokey arrangement, robotics are employed to select a food item, place it on a cooking area for cooking, and turn and remove the food at an appropriate time. Gokey is suitable for cooking, for example, meat, poultry, or fish.

The aforementioned two prior art patents, as well as numerous other prior art directed to the same technology, are extremely primitive and only suited for a very small number of food items. For example, in Wong, due to the carousel design of the ingredient storage compartments, once a food item is heated, it may not be automatically removed from the heat. Rather, other ingredients may be added and the total mixture further cooked. Moreover, only one heating element and cooking vessel may be used. Since the arrangement of the cooking vessel and storage compartments does not allow mixing of items after cooking. Thus, recipes calling for some ingredients to be boiled and others sauted would be impossible to make.

The Gokey arrangement is capable of little more than placing strips of meat or similar items on a grill, and then removing them. Additionally, Gokey requires a complicated set of robotics, making it expensive and unsuitable for home use.

In view of the above, there exists a need in the art for a more versatile cooking apparatus which can cook and dispense various solid and liquid ingredients, and which can provide for cooking items which are more complicated then simply mixing ingredients in a single pot and heating them at a desired temperature or simply placing items on a grill.

SUMMARY OF THE INVENTION

The above and other problems of the prior art are overcome in accordance with the present invention which relates to a method and apparatus for computerized cooking, preferably in the home. In accordance with the invention, at least two cooking vessels are employed, and means are provided for cooking and then straining cooked items. Additionally, the strained or other items may be cooked and then later mixed in other cooking vessels.

Means are provided for introducing both liquid and solid ingredients, and for cooking each at a preferred time in the cooking schedule. Automatic straining and transfer means are provided for heating ingredients enveloped in liquid, draining the liquid, and then further cooking the ingredients in a separate cooking vessel without the liquid and/or with other ingredients. Thus, recipes requiring multiple cooking stages may be implemented.

The inventive apparatus also contemplates a novel dry ingredient dispenser which comprises several compartments which slide over a movable plate. As the compartments move over the plate, the plate no longer covers the bottom of the compartments, and the ingredients in the compartments thus release into a cooking vessel. Means are provided for allowing precise control of the cooking flames by a computer.

DETAILED DESCRIPTION OF THE PREFERRED EMBODIMENT

Figure 1:
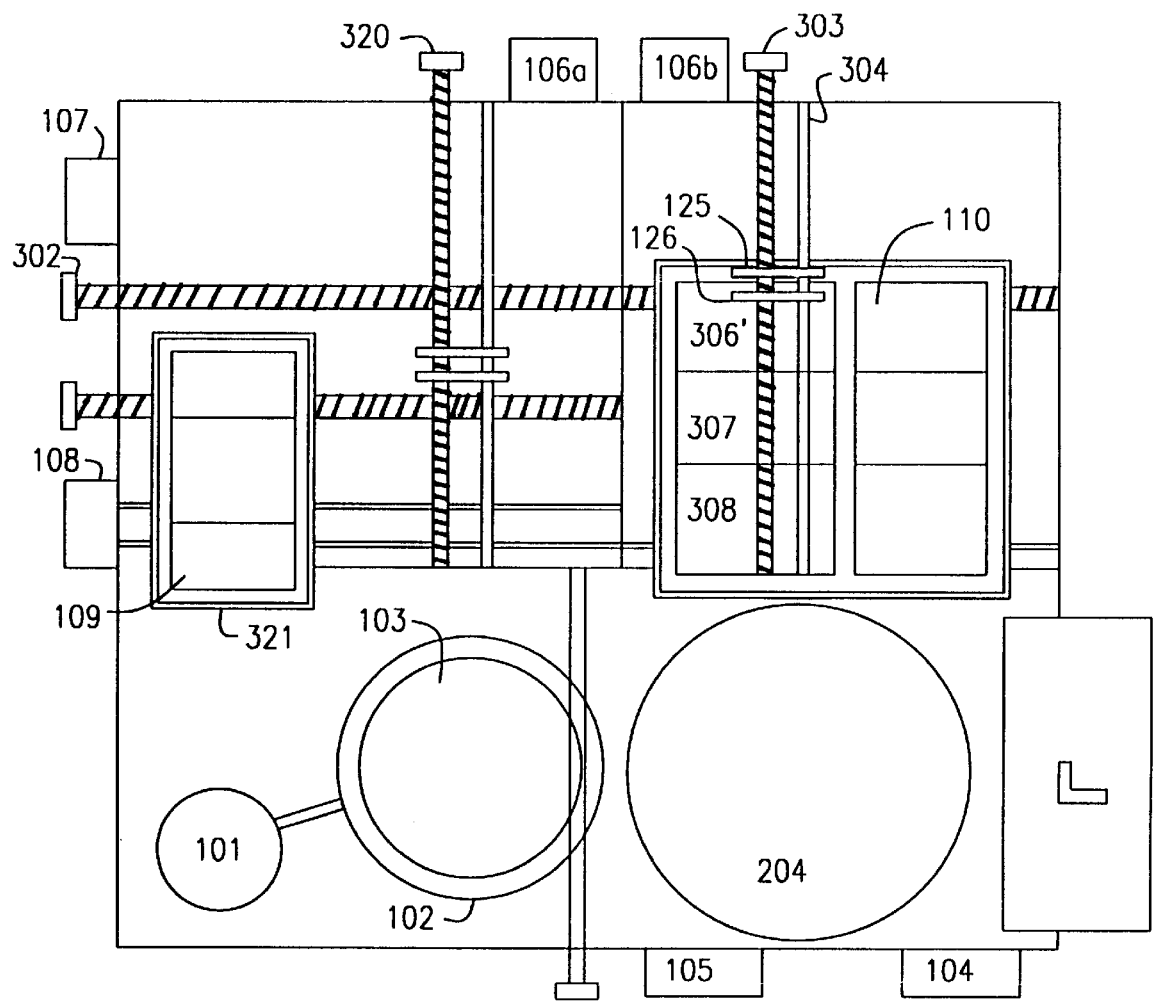
FIG. 1 shows a top view of an exemplary embodiment of the present invention.

FIG. 1 shows a top view of an exemplary apparatus in accordance with the present invention. The arrangement in FIG. 1 includes, among other items, the following: a liquid food storage vessel 101, a spherical cooking vessel 102 including a strainer 103, several motors 104 through 108 for causing motivation of numerous items to be described hereafter, and solid food storage containers 109 and 110, the operation of which will also be described hereafter. Each of solid food storage containers 109–110 includes a plurality of compartments, three of which are labeled as 306–308. The variety of other components shown in FIG. 1 will be described hereafter.

Figure 2:
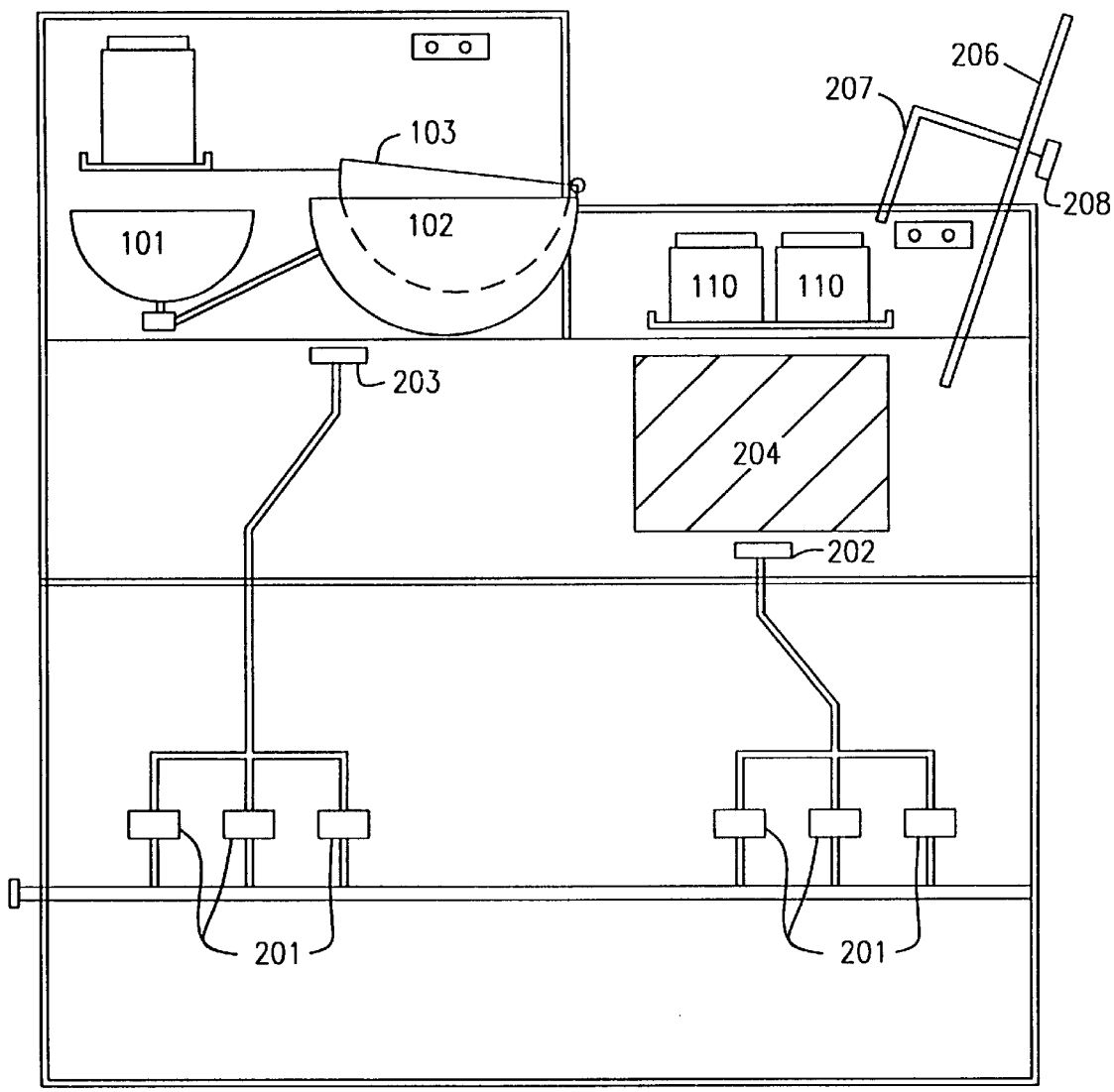
FIG. 2 is a side view of the arrangement of FIG. 1.

FIG. 2 shows a front view of the exemplary embodiment of the present invention which is shown in FIG. 1. FIG. 2 shows a plurality of gas valves 201 for supplying heat to numerous gas burners 202 to 203. A final cooking vessel 204 is arranged to receive food items from strainer 103 which are emptied from cooking vessel 102.

Figure 3:
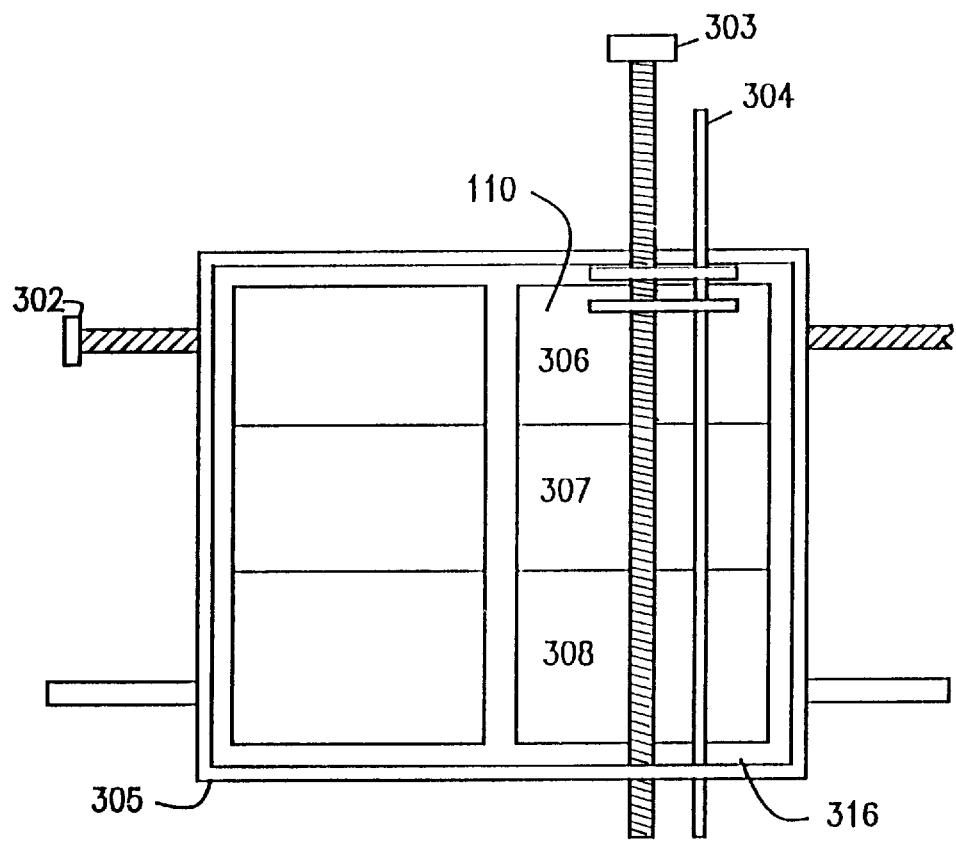
FIG. 3 is a top view of a portion of the ingredient dispenser apparatus.
Figure 6:
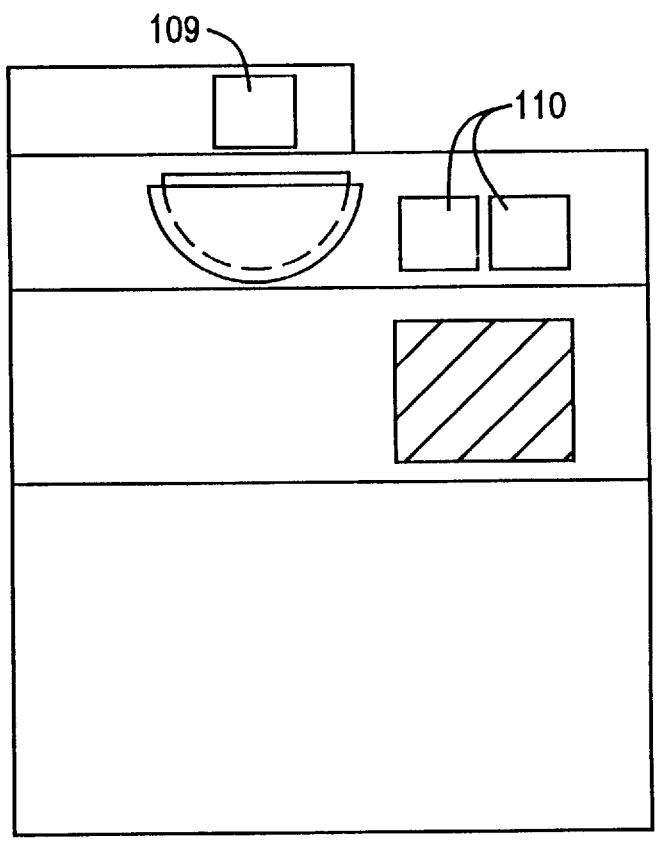
FIG. 6 is a closeup side view of two cooking vessels utilized in the present invention.

The food storage containers 109 and 110 are described in further detail with reference to FIGS. 3 and 6. The food storage containers 109 and 110 are each mounted upon a square chassis 316 as shown in FIG. 3. One or more vessels may be placed proximate to each of cooking vessels 102 and 204, as shown best by FIGS. 1 and 6. Additionally, as seen from FIG. 6, the vessels 109 and 110 may be on different vertical levels from each other in order to facilitate the release of ingredients into the different cooking vessels 204 and 102.

In operation and referring to FIG. 3, a motor 107 is connected to threaded shaft 302 and the threaded shaft 302 turns, causing the chassis 316 to move right and left. A second threaded shaft 303 runs through the storage container 110. The storage container 110 can move relative to the chassis 316. The chassis 316 is moved right and left by the rotation of shaft 302, in order to precisely line it up with the cooking vessel into which the food items will be placed.

Plates 125 engage the upper lip 126 of compartment 306 as shown in FIG. 1. The food storage container 110 is then moved along the direction of shaft 303 by rotation of a threaded shaft 303 moving plates 125. As the food storage containers are moved by shaft 303, each compartment 306–308 thereof can be extended beyond the edge 305 so that compartments 308, 307, and 306 sequentially dump their contents into spherical cooking vessel 204 as shown in FIG. 1. Unthreaded shaft 304 is used to maintain stability.

In operation, the computer program controls the movement of shafts 303 and 302 so that the ingredients in compartments 306 through 308 are sequentially dumped into cooking vessel 204. Each of the storage vessels may dump their contents independently of the other and food items may also be released into the different cooking vessels at different times by the storage containers 109–110.

For example, shaft 303 may turn enough so that compartment 308 extends past edge 305. Since the compartments 306–308 have no bottoms, the contents of compartment 308 would then be dumped into the cooking vessel 204. In accordance with the preprogrammed cooking schedule, shaft 303 may then reverse direction, retracting storage container 110 while the food item cooks in vessel 204. At an appropriate time, shaft 303 may then activate again and dump the contents of compartment 307 into cooking vessels 204. Additionally, during cooking of the food item in cooking vessel 102, shaft 320 may retract chassis 321 so that strainer 103 may rotate outward from cooking vessel 102, as described hereafter.

After cooking, strainer 103, as best seen in FIG. 2, is lifted out of spherical cooking vessel 102 in accordance with a computer program controlling motor 105. When the strainer 103 has reached an angle of rotation such that it is substantially removed from spherical cooking vessel 102, the stepper motor pauses to allow draining of any further liquid. After approximately 15 seconds of pause time, the rotation continues such that the cooked food item is then dumped from strainer 103 into final cooking vessel 204.

A comparison of FIGS. 1 and 2 shows that the storage vessel 109 and 110 are at different levels vertically. Specifically, storage container 110 is lower than the storage container 109. The system thus is constructed in such a way that food items in storage container 110 may be dumped into final cooking vessel 204, whereas food items in storage container 109 would be dumped into cooking vessel 102. Accordingly, items which need to be precooked (e.g.; fried or boiled) before being finally mixed and cooked with all of the ingredients will be loaded into food storage container 109, whereas items to be only cooked with the final ingredients in final cooking vessel 204 should be placed into food storage container 110.

Figure 7:
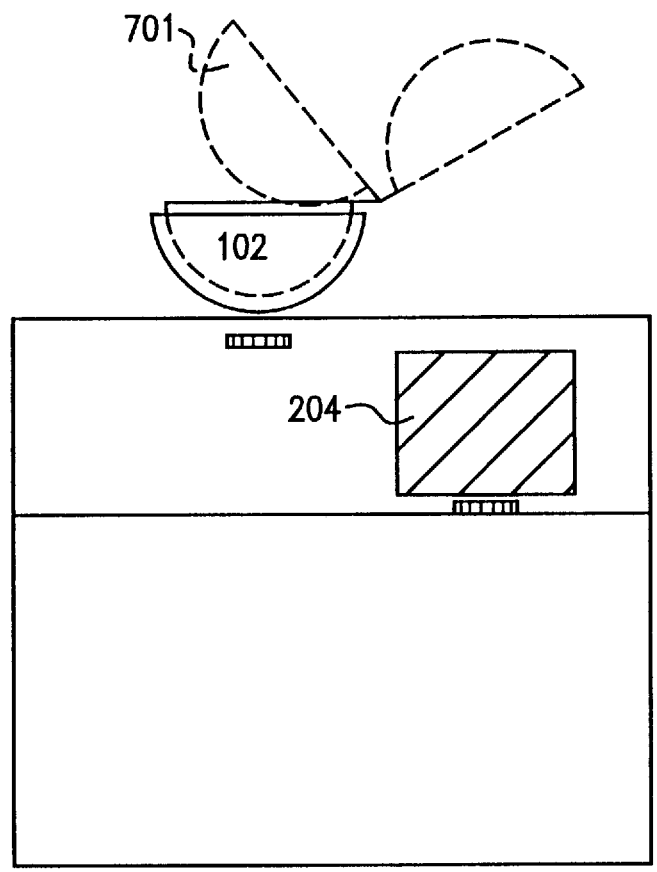
FIG. 7 is a side view of the exemplary apparatus of FIG. 6 but also showing other components thereof.

As can be appreciated from FIGS. 1 and 6, there are two food chassis, one below the other, to allow various food items to be cooked in either cooking vessel 102 or final cooking vessel 204. FIG. 7 shows a side view of cooking vessel 102 with strainer 103 being motivated out of said cooking vessel 102 and dumping its contents into final cooking vessel 204. The arrangement is accomplished by utilizing an axle 702 attached to a motor 105 (shown in FIG. 1) which permits rotation of strainer 103 through an angle of nearly 180 degrees. Additionally, it is noted that at position 701 of FIG. 7, the computer causes motor 105 to stop for a programmable amount of time, preferably approximately 15 seconds. This will cause any liquid oil or water utilized in cooking vessel 102 to be strained before the ingredients are dumped into final cooking vessel 204 by the completed rotation of strainer 103.

Both burners 203 and 202 are controlled by the computer in accordance with a particular cooking recipe. More specifically, the burners are controlled by the computer selectively activating valves, as described more fully below.

Figure 4:
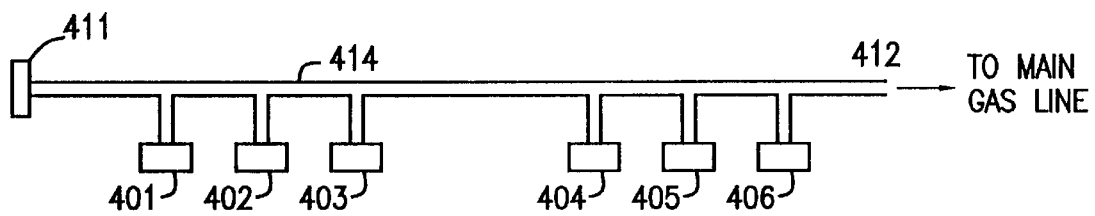
FIG. 4 shows a schematic of the heating mechanism of the present invention.
Figure 5:
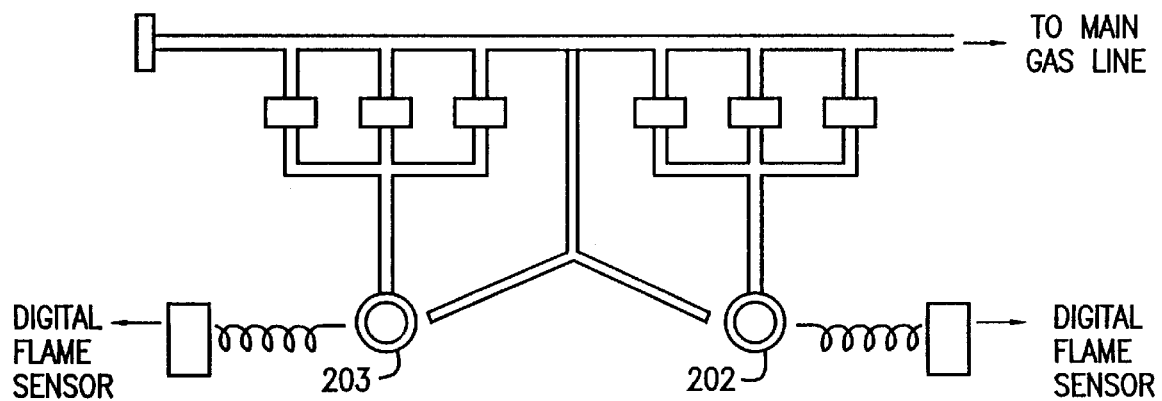
FIG. 5 is a more detailed schematic of the arrangement of FIG. 4.

Gas burners 202 and 203 are shown in more detailed form in FIG. 4. The gas pipe 414 is closed at one end 411 and receives gas from the other end 412. There are six flow control valves 401 through 406 preferably implemented as solenoid valves. Each of the three solenoid valves is connected in such a way as to supply gas at different levels. Specifically, valves 401 and 404 are low level valves, valve 402 and 405 are medium level valves, and valves 403 and 406 are high level. By controlling each of the valves with a separate on/off signal, it can be seen that numerous combinations of gas levels can be achieved for burners 202 and 203, each controlled by three of the gas valves. The gas valves may be ignited with pilot lights or electronically, both of which are known in the art.

Final cooking vessel 204 contains a cover 206 and motorized stirrer 207, also controlled via computer. Specifically, after the contents of strainer 103 are dumped into final cooking vessel 204, the motorized stirrer 207 is placed into the food by cover 206 closing and a motor 208 is utilized to turn stirrer 207 to stir the food as it cooks over burner 202.

Figure 8:
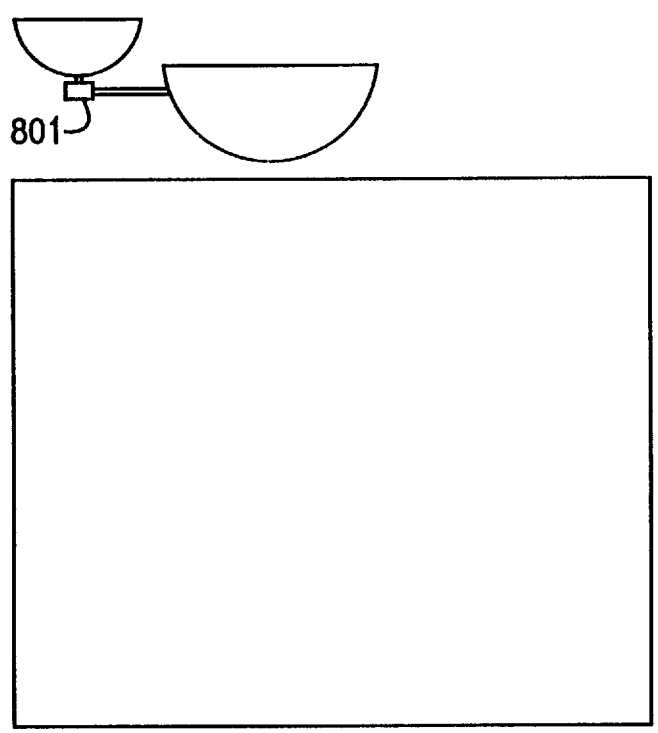
FIG. 8 displays a mechanism for dispensing liquid food items into the cooking vessel of the exemplary embodiment of FIG. 1.

FIG. 8 shows a close up view of the liquid food storage container 101 connected to the cooking vessel 102. A solenoid valve 801 is disposed between the two and connected to the personal computer for control. At any time during the cooking cycle, and in accordance with the programmed schedule, the solenoid valve 801 may be opened by the computer and the contents of liquid storage container 101 dispensed into cooking vessel 102. Accordingly, recipes which call for initial cooking of certain items in cooking vessel 102 and then further cooking of other items with liquid can be accomplished. Specifically, cooking vessel 102 may be utilized to cook an item and then empty its contents into final cooking vessel 204. Thereafter, a subsequent item can be fried or boiled by dispensing water or oil from liquid storage container 101 into the cooking vessel 102.

Figure 9:
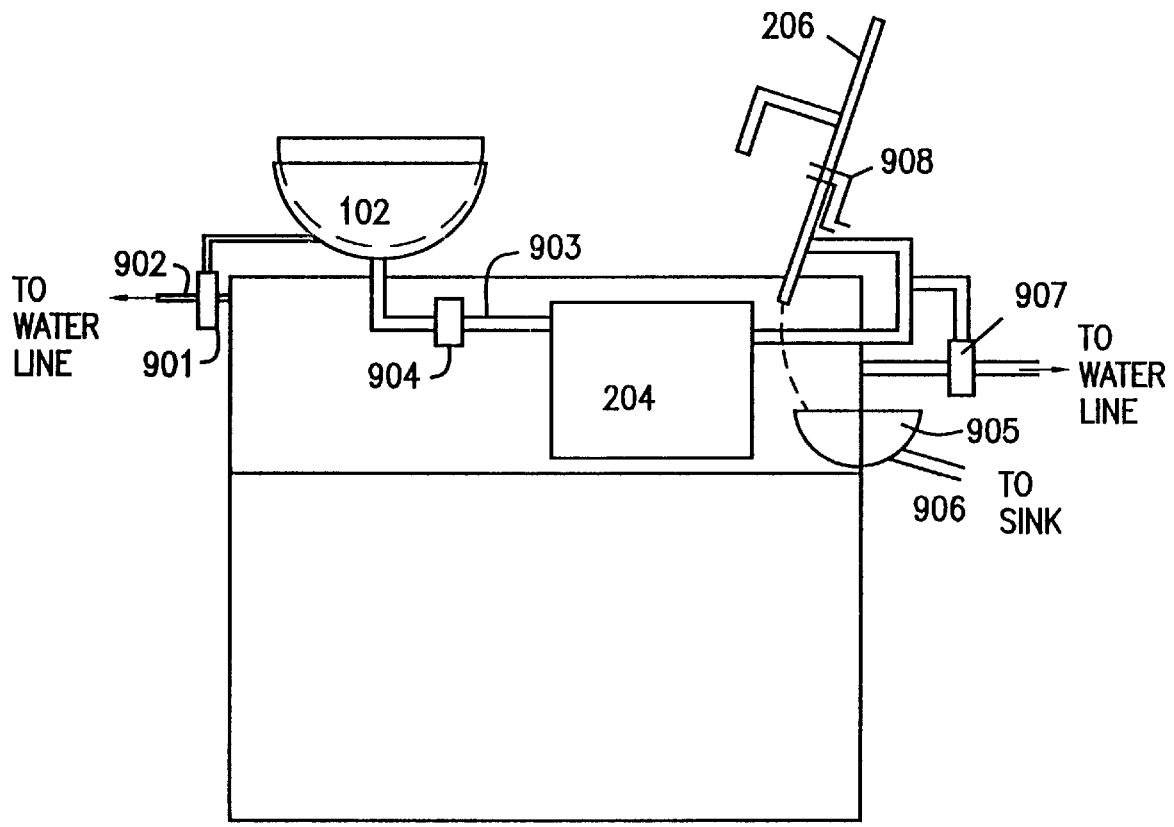
FIG. 9 shows an additional side view of the exemplary embodiment of the present invention.

FIG. 9 shows some additional enhancements to the present invention wherein a solenoid valve 901 is utilized to selectively introduce water from a main water input line 902 to cooking vessel 102. An additional solenoid valve 904 is utilized to control transfer of liquid from cooking vessel 102 through pipe 903. Once the liquid is transferred, it may be dumped into a fluid outlet 905 for dispensing to a sink through pipe 906, which is the case when the cover 206 is in the open position. If however, cover 206 is in the closed position, then pipe 908 will transport the liquid into final cooking vessel 204. Valve 907 controls the input of water to vessel 204.

From the foregoing, it can be appreciated that what is shown and described is an apparatus which provides very precise computer controlled cooking in which a suitable home use and controlled by a personal computer. While the above describes the preferred embodiment of the invention, various other modifications or additions would be apparent to those of ordinary skill in the art.

I claim:

1. Automatic computer controlled cooking apparatus comprising:

a first cooking vessel for holding and cooking food items;

food storage container means for sequentially dispensing, one at a time, a plurality of different food items into said cooking vessel means, said food storage container means comprising a plurality of compartments and a chassis underneath said compartments, said chassis being movable with respect to said compartments so that said compartments may be moved away from said chassis and that said chassis no longer is under said compartments such that food items within said compartment will be dispensed from the bottom of said compartment; and motivation means for accepting commands from a computer and, in response to said commands, moving said food storage compartments over said first cooking means and dispensing items in said compartments to said first cooking means.

2. Apparatus of claim 1 further comprising strainer means disposed within said first cooking means for straining cooked products.

3. Apparatus of claim 2 further comprising rotational means for receiving commands from a computer and, in response to said commands, rotating said strainer out of said first cooking means and over said second cooking means such that products in said strainer means are dumped into said second cooking means.

4. Apparatus of claim 3 wherein said rotational means comprises means for pausing rotation after said strainer is rotated out of said first cooking means but before said food product is dumped into said second cooking means.

5. Apparatus of claim 1 wherein said motivation means comprises a plurality of threaded shafts arranged perpendicular to one another for moving the chassis and food storage compartments relative to each other.

6. Apparatus of claim 5 further comprising at least one burner for heating food items, said burner being connected to a plurality of flow control valves, each of said flow control valves having different capacities, each of said flow control valves being controllable by the computer, such that a computer may turn such flow control valves on or off in different combinations to achieve various levels of heat for cooking.

7. Apparatus of claim 5 further comprising liquid food storage means;

pipe means connecting said liquid food storage means to said first cooking vessels; and means for causing liquid stored in said liquid food storage means to be automatically injected into said first cooking vessel means at a predetermined step in a recipe.

* * * * *